United States Patent [19]

Severinghaus, Jr.

[11] Patent Number: 4,661,164
[45] Date of Patent: Apr. 28, 1987

[54] METHOD OF TINTING A MINERAL FILLER

[75] Inventor: Nelson Severinghaus, Jr., Nashville, Tenn.

[73] Assignee: Franklin Industries, Inc., Nashville, Tenn.

[21] Appl. No.: 702,004

[22] Filed: Feb. 15, 1985

[51] Int. Cl.$^4$ .............................................. C04B 14/00
[52] U.S. Cl. ............................ 106/288 B; 106/288 Q; 106/309
[58] Field of Search ............... 106/288 B, 288 Q, 291, 106/309

[56] References Cited

U.S. PATENT DOCUMENTS

| | | | |
|---|---|---|---|
| 2,581,414 | 1/1952 | Hochberg | 106/309 |
| 2,855,156 | 10/1958 | Hochberg et al. | 106/309 |
| 3,857,719 | 12/1974 | Baak et al. | 106/288 B |
| 3,861,934 | 1/1975 | Mallary et al. | 106/288 B |
| 3,932,194 | 1/1976 | Lamar et al. | 106/306 |
| 3,937,632 | 2/1976 | Nott | 106/288 B |
| 4,196,016 | 4/1980 | Simon | 106/309 |
| 4,239,736 | 12/1980 | Fenske | 423/173 |
| 4,298,399 | 11/1981 | Formica et al. | 106/288 Q |
| 4,469,519 | 9/1984 | Iyengar | 106/288 Q |

OTHER PUBLICATIONS

"Fillers, Filters and Absorbents", Industrial Minerals and Rocks, Society of Mining Eng. of the American Institute of Mining, Metallurgical and Petroleum Eng. Inc., 1983.

Primary Examiner—A. Lionel Clingman
Assistant Examiner—Willie J. Thompson
Attorney, Agent, or Firm—Harrington A. Lackey

[57] ABSTRACT

A method of increasing the whiteness of a mineral filler, such as limestone, having a natural yellow tint, including the grinding of the limestone to a pulverulent size and introducing into the limestone, preferably while it is being ground, a blue pigment in an amount sufficient to optically transform the natural yellow tint to a predetermined degree of whiteness.

13 Claims, 1 Drawing Figure

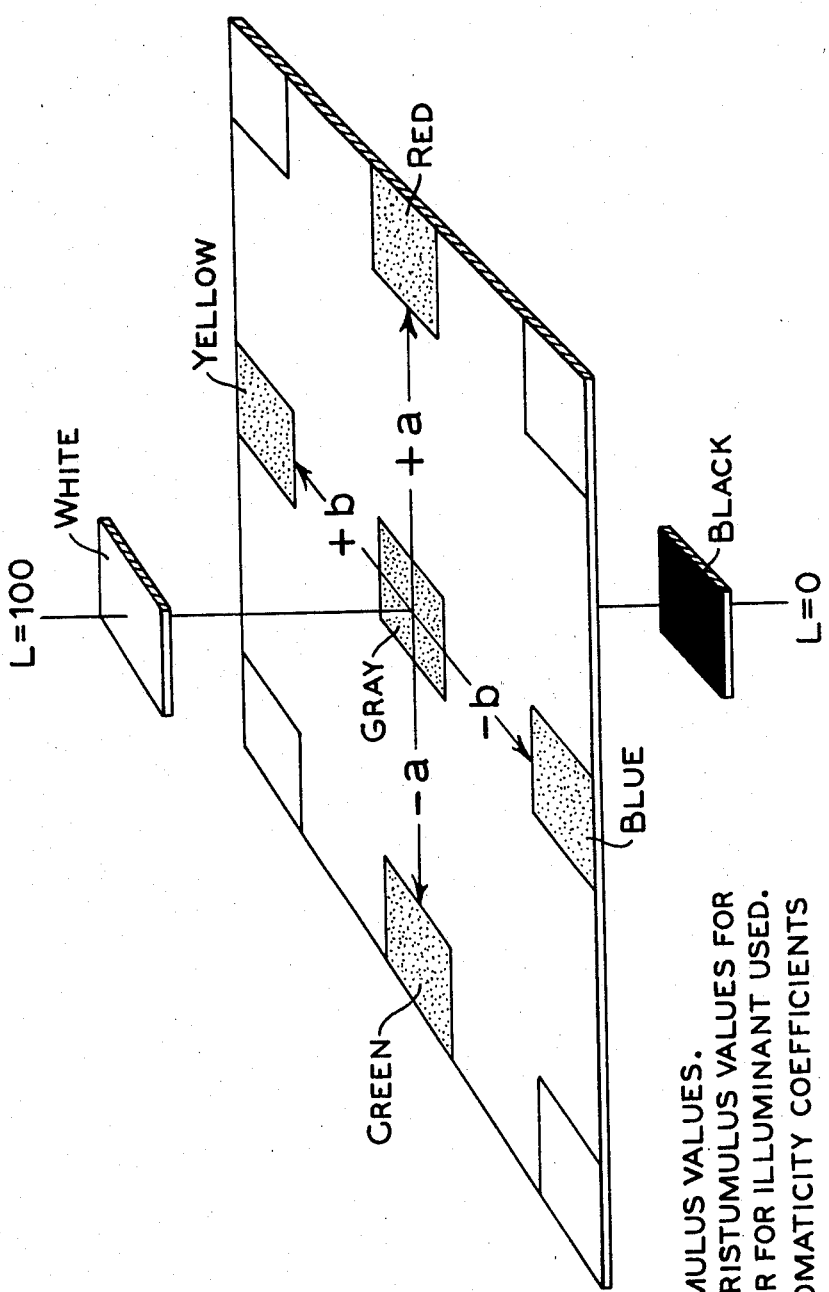

METHOD OF TINTING A MINERAL FILLER

BACKGROUND OF THE INVENTION

This invention relates to a method of tinting a mineral filler, and more particularly to increasing the whiteness of a mineral filler.

Mineral fillers, such as limestone, dolomite, kaolin, talc, feldspar, mica, barite, gypsum, diatomite and some clays are used to fill and/or extend industrial products, such as paint, paper, plastics, rubber, adhesives, caulks, drywall, joint cement, and athletic field markers. In a great number of such applications, the color of the mineral filler is of utmost importance, since the color of the mineral filler may affect the color of the finished product. Generally, white is the most desirable color, or the absence of color.

These mineral fillers come from mineral deposits, many of which are contaminated with various inorganic or organic elements or compounds that give the filler produced from these deposits a color or tint other than white.

Various attempts have been made to remove colorants from mineral fillers, with varying degrees of success. One particularly troublesome color contamination problem is the occurrence of a yellow tint (iron oxide) in limestone. Some of the yellow tint in mineral fillers, such as limestone, can be removed by bleaching. Differential froth flotation can separate some coloring minerals from the mineral filler. High intensity magnetic separation is also utilized to improve the brightness of some mineral fillers.

The processes for the improvement of the whiteness of certain industrial products, other than mineral fillers, are disclosed in the following U.S. Pat. Nos.:

| 2,136,782 | Bucy | Nov. 15, 1938 |
| 2,191,947 | Allen | Feb. 27, 1940 |
| 2,950,207 | Jones | Aug. 23, 1960 |
| 3,669,896 | Preininger et al | Jun. 13, 1972 |

The above Bucy and Allen patents are limited to the utilization of blueing agents with white pigments or with the industrial product, such as paints, varnishes, fabrics and paper, to prevent the yellowing of the products by aging. The Bucy patent is limited to a substantially colorless blueing pigment, specifically molybdenum trioxide, which gradually turns blue upon aging.

The Allen patent utilizes blueing agents, such as ultramarine blue or iron blues, for inhibiting the yellowing by aging of white baking enamels.

The Jones patent is limited to the use of a combination of a blue organic pigment and a violet organic pigment, both for eliminating the yellow tinge in filaments of regenerated cellulose.

The Preininger et al, patent relates only to the utilization of optical brighteners with inorganic white pigments.

SUMMARY OF THE INVENTION

It is therefore an object of this invention to provide a method for improving or increasing the whiteness of a mineral filler having a color tint by the introduction of an optically neutralizing colorant into the mineral filler while the filler is being ground, or after it has been ground. The method is particularly adapted for the treatment of calcium carbonate, or limestone, having a natural yellow mineral tint, such as iron oxide, with a neutralizing blue pigment, such as ultramarine blue.

The mineral filler, such as limestone including a yellow tint, is ground to a pulverulent size while a blue pigment, such as ultramarine blue, is added to the mineral filler as it is being ground, at a uniform rate and in such a manner that the pigment or colorant is totally dispersed and intimately intermixed with the ground mineral filler.

The amount of blue pigment added to the mineral filler is a small fraction by weight of the mineral filler, but sufficient to optically transform or neutralize the natural yellow tint to a predetermined degree of apparent whiteness. It has been found that a slight excess of blue pigment, which gives a slightly blue tint to the mineral filler appears whiter to the ordinary eye than a measured complete optical neutralization of the yellow tint by the blue pigment.

The grinding of the mineral filler may be carried out in the conventional dry grinding process or a wet grinding process, and may be carried out in various types of grinding mills.

The limestone or mineral filler may be ground to various pulverulent sizes. However, it is known that the finer the grinding, the greater degree of whiteness of the mineral filler, even without the addition of the colorant.

DESCRIPTION OF THE DRAWING

The single FIGURE of the drawing is a prior art three-dimensional color scale.

DESCRIPTION OF THE PREFERRED EMBODIMENTS

In a preferred form of the invention, limestone or calcium carbonate, bearing a yellow mineral tint, such as iron oxide, is preferably treated with a blueing pigment. The blueing pigment which has been successfully used in the optical neutralization of the yellow tint within the limestone is ultramarine blue.

Other blue pigments or dyes which may be utilized in the process are cobalt aluminate, cobalt blue, iron blue, manganese blue, titanium blue phthalocyanine blue and indanthrene blue.

Typical grinding mills which may be utilized for grinding the limestone, or the ground mixture of limestone and ultramarine blue, are ring roll grinding mills, pebble grinding mills, ball grinding mills, impact grinding mills, attrition grinding mills, or fluid energy grinding mills.

In a typical process for the treatment of limestone having a yellow mineral tint, such as iron oxide, in accordance with this invention, the limestone is fed at a controlled rate through one of the above described grinding mills, to grind the limestone into a desired pulverulent size. While the limestone is being ground, a blue pigment, such as ultramarine blue, is simultaneously fed at a carefully controlled rate into the limestone. Thus, the limestone and the blue pigment are simultaneously ground, but more importantly, are thoroughly mixed so that the blue pigment is widely dispersed throughout the ground limestone.

The amount of blue pigment introduced into the limestone is only a small fraction by weight of the ground limestone, and will depend upon the amount and intensity of the yellow tint, such as the iron oxide, originally, naturally occurring in the limestone. The amount of blue pigment utilized is sufficient to optically neutralize or cancel the yellow color of the mineral tint to achieve the desired degree of apparent optical whiteness.

It is also within the scope of this invention to introduce the blue pigment into the ground mineral filler after the mineral filler has been ground. However, tests have shown that, although some improvement in whiteness results, this method of introducing the blue pigment into the ground mineral filler is not as effective, nor as efficient, as feeding the blue pigment into the mineral filler, while the mineral filler is being ground.

The degree of finite optical whiteness may be determined by insertion of a sample of the ground mixture of limestone and ultramarine blue into a "Hunter Reflectometer". A standardized beam of light is directed in the "Hunter Reflectometer" upon the sample mixture, and a plurality of light sensors, such as electric eyes receive the light reflected from the sample. The sensors transmit the light signals through a computerized control system which measures the various degrees of light and computes certain light indexes.

The single sheet of drawing discloses certain color and brightness scales, and certain formulas, utilized in the computerized system of the "Hunter Reflectometer" for producing indicated color results. The "Hunter Reflectometer" produces read-outs for the L Scale, the "a" Scale and the "b" Scale. Moreover, the reflectometer also produces a computed whiteness index value, referred to as the WI Whiteness number.

The L scale on the "Hunter Reflectometer" indicates a gradual increase in light or brightness from black (L=0) to pure white (L=100). The "a" scale or axis indicates the degree or tone of color, or chroma, between the colors green and red, while the "b" scale or axis indicates the degree of color, or chroma, between the colors blue and yellow.

Specific examples of the process are as follows:

EXAMPLE I

Central Texas limestone was fed at the rate of 4 tons per hour to an air swept grinding mill and ground to 89 percent finer than 325 mesh (approximately 44 micron particle size), to which ultramarine blue was continuously added at a rate of two pounds per hour with the following results:

TABLE I

| Hunter Reflectometer | Before Addition of Ultramarine Blue | After Addition of Ultramarine Blue |
| --- | --- | --- |
| WI Whiteness | 55.7 | 66.0 |
| L Scale | 92.9 | 91.6 |
| a Scale | 0.0 | −0.3 |
| b Scale | +5.6 | +3.3 |

EXAMPLE II

Central Texas limestone was fed at the rate of 3 tons per hour to a tube mill and ground to a median particle size of 3.5 microns, with a top size of 10 microns, with the continuous addition of ultramarine blue at a rate of 2.25 pounds per hour, with the following results:

TABLE II

| Hunter Reflectometer | Before Addition of Ultramarine Blue | After Addition of Ultramarine Blue |
| --- | --- | --- |
| WI Whiteness | 67.9 | 77.0 |
| L Scale | 95.5 | 95.5 |
| a Scale | −0.1 | −0.4 |
| b Scale | +4.1 | +2.3 |

It is evident from the above examples that the degree of yellowness, or the intensity of the yellow tint, in the ground limestone is substantially reduced in both examples. As a matter of fact, in both examples, the degree of yellowness on the "b" Scale is reduced in value by almost one-half of the original yellow tint found in the untreated limestone.

Also in both examples, the "whiteness" of the limestone after it is treated with the ultramarine blue is increased by approximately 10 points on the Whiteness Index (WI) Scale.

The L Scale in both examples illustrates that the brightness of the treated limestone decreases very slightly from its original brightness before it is treated with the ultramarine blue.

Although Tables I and II indicate a slight shift on the "a" scale, negatively, to indicate a shift toward the green color, nevertheless, the increased greenish tint is imperceptible.

It will be understood that the amount of blue pigment, or ultramarine blue, introduced into the mineral filler will depend upon the degree to which it is desired to neutralize the yellow tint, which in turn may depend upon the amount of yellow mineral tint naturally found in the natural limestone, and the desired apparent or finite (measured) whiteness desired.

What is claimed is:

1. A method of increasing the whiteness of a mineral filler having a natural tint, comprising the steps of:
   (a) introducing into a predetermined amount of the mineral filler a pigment of a color and in an optimum amount sufficient to optically transform the natural tint to a predetermined degree of whiteness in said mineral filler,
   (b) intimately intermixing with said predetermined amount of mineral filler said optimum amount of pigment in such a manner that said pigment is widely dispersed in said mineral filler and optically transforms said natural tint to said predetermined degree of whiteness in said mineral filler.

2. The method according to claim 1 in which the mineral filler consists of a group including limestone, dolomite, kaolin, talc, feldspar, mica, barite, gypsum, and diatomite.

3. The method according to claim 2 in which said mineral filler comprises limestone.

4. The method according to claim 1 in which the tint in the mineral filler is a yellow mineral tint, and said pigment is a blue pigment.

5. The method according to claim 4 in which said blue pigment consists of the group including ultramarine blue, cobalt aluminate, cobalt blue, iron blue, manganese blue, titanium blue, phthalocyanine blue, indanthrene blue.

6. The method according to claim 5 in which said blue pigment comprises ultramarine blue.

7. The method according to claim 4 in which the mineral filler is limestone and the yellow mineral tint is iron oxide.

8. The method according to claim 7 in which said blue pigment is ultramarine blue.

9. The method according to claim 1 in which said intermixing step comprises grinding said predetermined amount of mineral filler.

10. The method according to claim 9 further comprising introducing said pigment into the mineral filler at a predetermined rate during said grinding step, so that said mineral filler and said pigment are ground simultaneously.

11. The method according to claim 9 further comprising introducing said pigment into the mineral filler after said grinding of the mineral filler has been completed, and mixing said pigment with said ground mineral filler.

12. The method according to claim 9 in which said grinding step comprises dry grinding said mineral filler.

13. The method according to claim 9 in which said grinding step comprises wet grinding said mineral filler.

* * * * *